(12) United States Patent
Wong

(10) Patent No.: US 9,674,492 B1
(45) Date of Patent: Jun. 6, 2017

(54) MOTION DETECTION EQUIPMENT CALIBRATION SYSTEM

(71) Applicant: Thomas K. Wong, San Francisco, CA (US)

(72) Inventor: Thomas K. Wong, San Francisco, CA (US)

( * ) Notice: Subject to any disclaimer, the term of this patent is extended or adjusted under 35 U.S.C. 154(b) by 204 days.

(21) Appl. No.: 14/644,282

(22) Filed: Mar. 11, 2015

(51) Int. Cl.
*H04N 7/18* (2006.01)
*H04N 17/00* (2006.01)

(52) U.S. Cl.
CPC ........... *H04N 7/183* (2013.01); *H04N 17/002* (2013.01)

(58) Field of Classification Search
CPC ....... H04N 5/2224; H04N 5/2258; H04N 7/18
See application file for complete search history.

(56) References Cited

U.S. PATENT DOCUMENTS

| | | | |
|---|---|---|---|
| 5,363,688 A | 11/1994 | Elwell | |
| 7,636,039 B2 | 12/2009 | Babich | |
| 2010/0066828 A1* | 3/2010 | Disaro | H04N 17/002 348/143 |
| 2014/0034780 A1* | 2/2014 | Gonzalez | A63H 27/08 244/33 |
| 2014/0088904 A1 | 3/2014 | Covaro | |

FOREIGN PATENT DOCUMENTS

KR 101443151 9/2014

* cited by examiner

*Primary Examiner* — Huy T Nguyen
(74) *Attorney, Agent, or Firm* — Thomas R. Lampe

(57) ABSTRACT

A system for calibrating the video camera of motion detection equipment based on movement of a lighter than air motion object within the camera view of the video camera, the lighter than air object including at least one balloon filled with helium or other lighter than air gas.

12 Claims, 4 Drawing Sheets

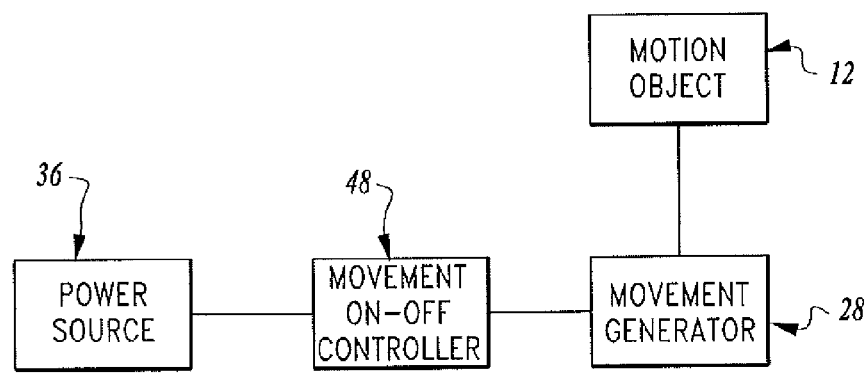
Fig. 1
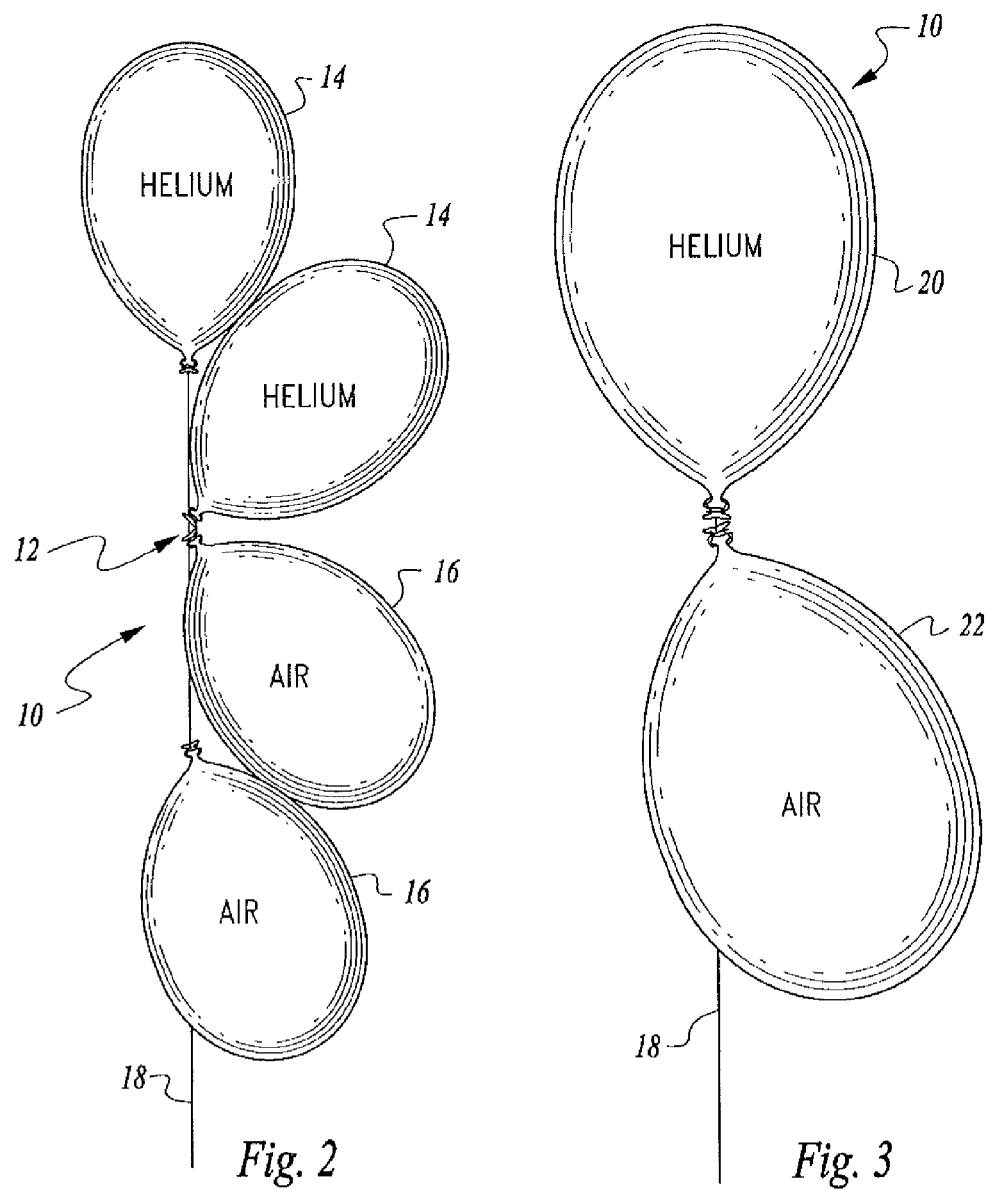
Fig. 2
Fig. 3

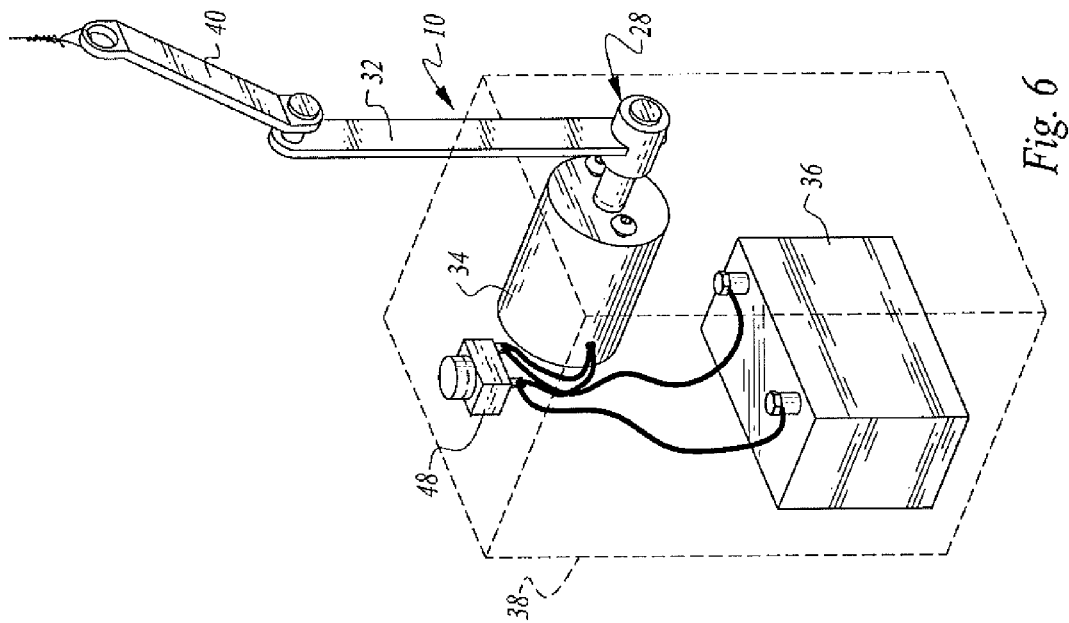
Fig. 6
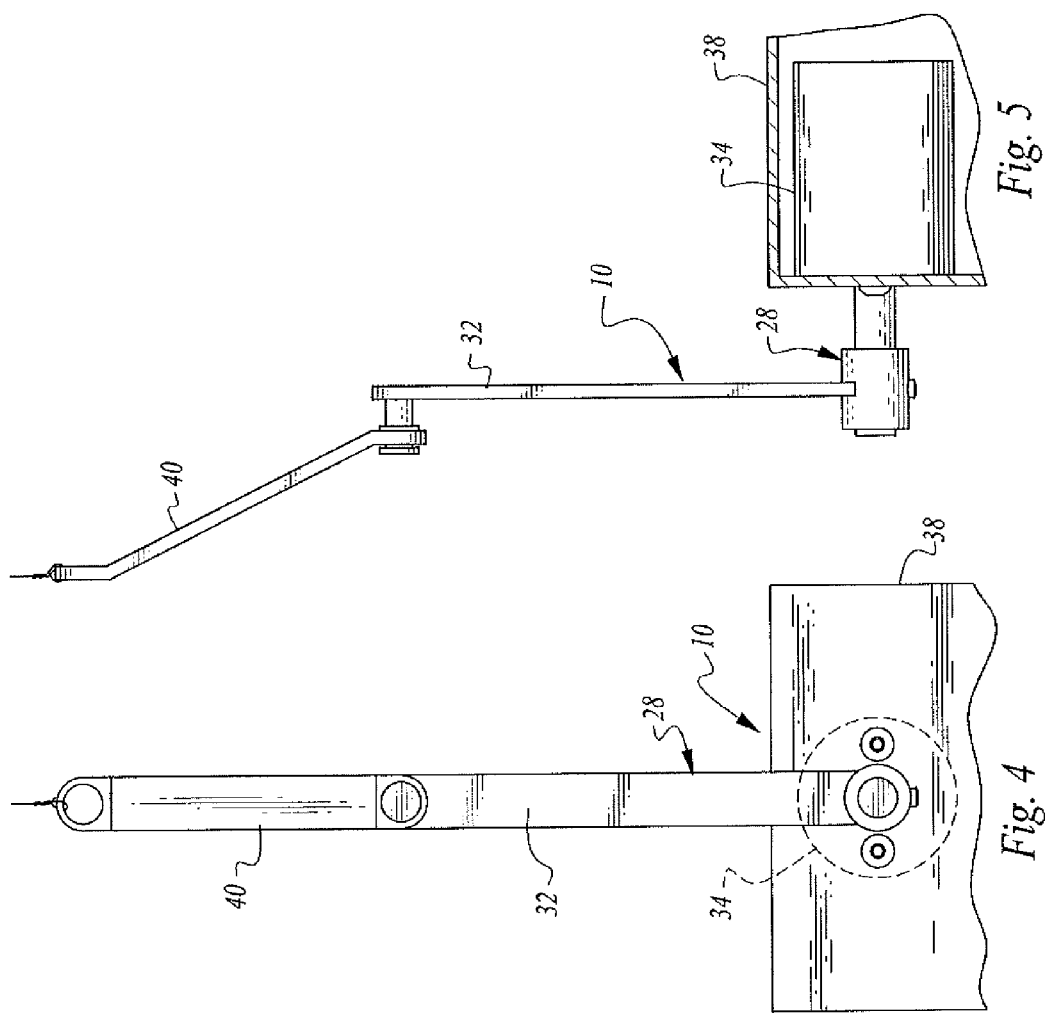
Fig. 5
Fig. 4

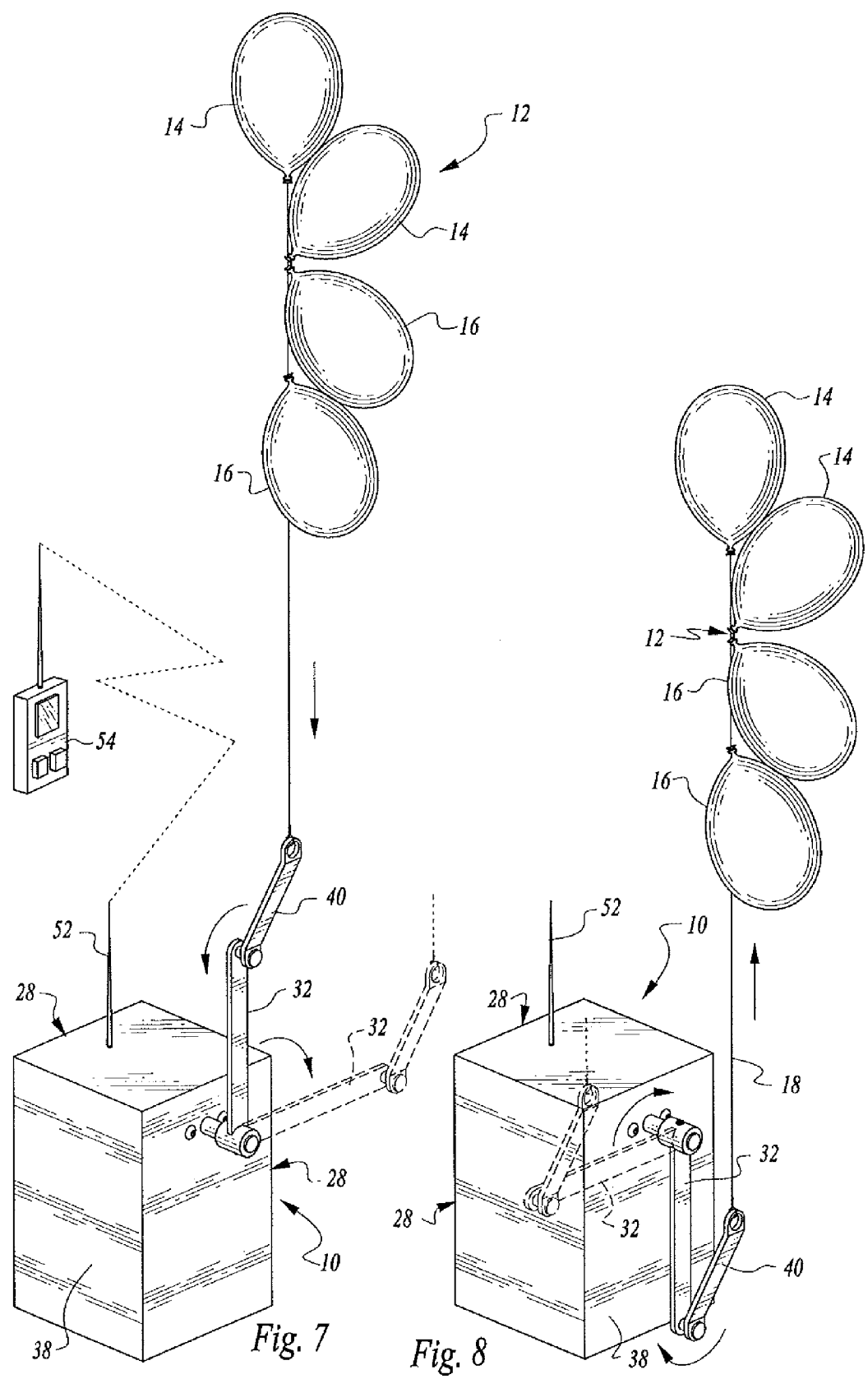

MOTION DETECTION EQUIPMENT CALIBRATION SYSTEM

TECHNICAL FIELD

This invention relates to apparatus and a method for calibrating motion detection equipment including a video camera.

BACKGROUND OF THE INVENTION

To reduce data storage and data transmission, most surveillance camera systems have motion detection capabilities for activation when motion is detected. Motion activation can be derived from a wide range of devices and methods such as video motion detection, infrared motion sensors, and a variety of video analytic metrics. They do boil down to some kind of sensitivity adjustments for the selected motion detection metric(s) to achieve the desired results. When detection is too sensitive, too much false motion detection will result. When it is not sensitive enough, important motion such as an intrusion may be missed.

The current common practice is to either ignore the sensitivity adjustment issue or set motion sensitivity to very high, as the costs of data storage and bandwidth are not prohibitively expensive. In recent years when live video monitoring has become more common, to reduce the monitoring load, some conscientious installers are beginning to pay attention to proper sensitivity adjustments.

To perform motion sensitivity adjustment (or motion calibration), a moving object, typically a human being moving around to resemble the motion of an intruder, is employed to simulate an intrusion.

Motion calibration is particularly challenging for outdoor cameras. A calibration done during daytime is unlikely to be valid at nighttime, particularly when motion detection is done through the video motion detection method, which is one of the most common forms of motion detection for camera systems. The views of the same camera in daytime and nighttime are very different. The reduced light level at night substantially lowers the contrast of any motion seen through a camera, thus requiring higher motion sensitivity adjustments for proper motion detection. Therefore, to achieve reliable video motion detection results, motion calibration should be done after dark. In winter when sunset occurs early in the evening, doing night calibration is not as challenging for the worker. However for the months when sunset occurs late in the evening, night calibration poses a major challenge on workers' schedules since they no longer enjoy the typical work hours like the majority of the work force. This challenge makes the calibration job less desirable or requires higher pay to compensate.

In addition, night calibration typically requires two people, one moves around to simulate the motion of an intruder and the other sets detection sensitivity. An alternative for only one worker is to walk back and forth to simulate movement, review equipment's motion detection performance, make adjustments, and repeat the process again as necessary. Both methods are labor intensive, not to mention raising possible safety issues when walking in the dark at night.

The subject invention is a calibration system including a method and apparatus for overcoming the aforementioned problems of labor inefficiency, possible safety hazards and irregular work hours associated with nighttime motion calibration. One of the most significant challenges is to utilize an apparatus which is low cost, easy to use and readily transportable, as quite a number of them may be needed for a particular job. Also, the time and cost involved in retrieving the calibration devices may counteract the economic benefits of the invention unless the devices are so inexpensive that they can be disposable.

In essence, the subject invention is a specialized very low cost motion generator with its motion and control suitable for video motion calibration, and having very high energy efficiency so that it can be powered by an inexpensive battery.

Alternative motion generators of various types are known generally in the robotics and sign industries; however, applicant is not aware of any system employing motion generators in the field of the present invention using the apparatus and method disclosed and claimed herein.

A patentability search directed to the present invention located the following patent documents: U.S. Pat. No. 7,636,039, issued Dec. 22, 2009, U.S. Pat. No. 5,363,688, issued Nov. 15, 1994, U.S. Patent Application Pub. No. US 2014/0088904, published Mar. 27, 2014, and Korean Patent No. KR101443151, granted Sep. 24, 2014.

The located prior art is not very relevant to the present invention.

With the existing robotics prior arts, one can certainly create a moving robot, which generates motion that may simulate human movements. However, it is so cost prohibitive that is not a real solution to the problems addressed by the present invention.

In the sign industry a variety of moving signs serve as motion generators and at costs much less than a moving robot.

The common moving signs include flags, streamers, balloons, and other inflatable objects. When there is wind, flags, streamers, and balloons will move, but their movements are often limited and unpredictable, not suitable for motion calibration. When there is no wind, they are motionless. Other inflated signs with air or helium behave just like large balloons. There are other inflatable promotional objects with a running air blower that can generate significant and predictable movements for motion calibration. However, the air blower consumes too much energy to be powered by a small battery, and is still too costly to be practical. With the advent of human moving board signs at street corners, electrical equivalents of moving human signs driven by a large motor to move a signboard are now available. Unfortunately, they also consume a lot of power and are expensive to build, therefore not practical for motion calibration.

DISCLOSURE OF INVENTION

The system of the present invention includes an apparatus for calibrating motion detection equipment including a video camera.

The apparatus includes a lighter than air motion object structure wholly or partially comprising at least one balloon filled with helium or other lighter than air gas.

A movement generator structure moves the motion object structure within the view of the video camera.

A controller is operatively associated with the movement generator structure for activating and deactivating the movement generator structure. A power source provides electrical power to the movement generator structure.

The system of this invention also includes a method for calibrating motion detection equipment including a video camera.

The method includes the step of providing a lighter than air motion object structure wholly or partially comprising at least one balloon filled with helium or other lighter than air gas and positioning the lighter than air motion object structure within the view of the video camera.

A movement generator structure is employed to move the motion object structure within the view of the video camera.

A controller is utilized in association with the movement generator structure for activating and deactivating the movement generator structure. A power source is employed to provide electrical power to the movement generator structure.

The video camera is calibrated based on the movement of the motion object structure.

Other features, advantages and objects of the present invention will become apparent with reference to the following description and accompanying drawings.

BRIEF DESCRIPTION OF DRAWINGS

FIG. 1 is a schematic diagram of apparatus of the present invention;

FIG. 2 illustrates a lighter than air motion object structure of the present invention comprising four balloons;

FIG. 3 is an elevational view similar to FIG. 2, but illustrating an alternative lighter than air motion object structure comprised of two balloons;

FIG. 4 is a front, elevational view of movement generator components of the present invention including a rotation arm connected to an electric motor in a housing and an anti-tangle tab connected to the rotational arm and having a cord portion attached thereto;

FIG. 5 is a side, elevational view illustrating the structural components of FIG. 4;

FIG. 6 is a perspective view of the structural components of FIGS. 4 and 5 with the motor electrically connected to a battery and controlled by a photocell switch;

FIG. 7 is a perspective view showing the four balloon motion object structure of FIG. 2 attached to the movement generator structure and illustrating the motion object structure in an upper position in solid lines, and also depicting in dash lines the rotational arm and anti-tangle tab when utilized to lower the motion object structure;

FIG. 8 is a view similar to FIG. 7, but illustrating the motion object structure at a lower position when the rotation arm distal end and anti-tangle tab are also in lower position, dash lines being used to show alternative positions of the rotation arm and the tab when the motion object structure is being moved upwardly from the lower position.

MODES FOR CARRYING OUT THE INVENTION

Figure 9:
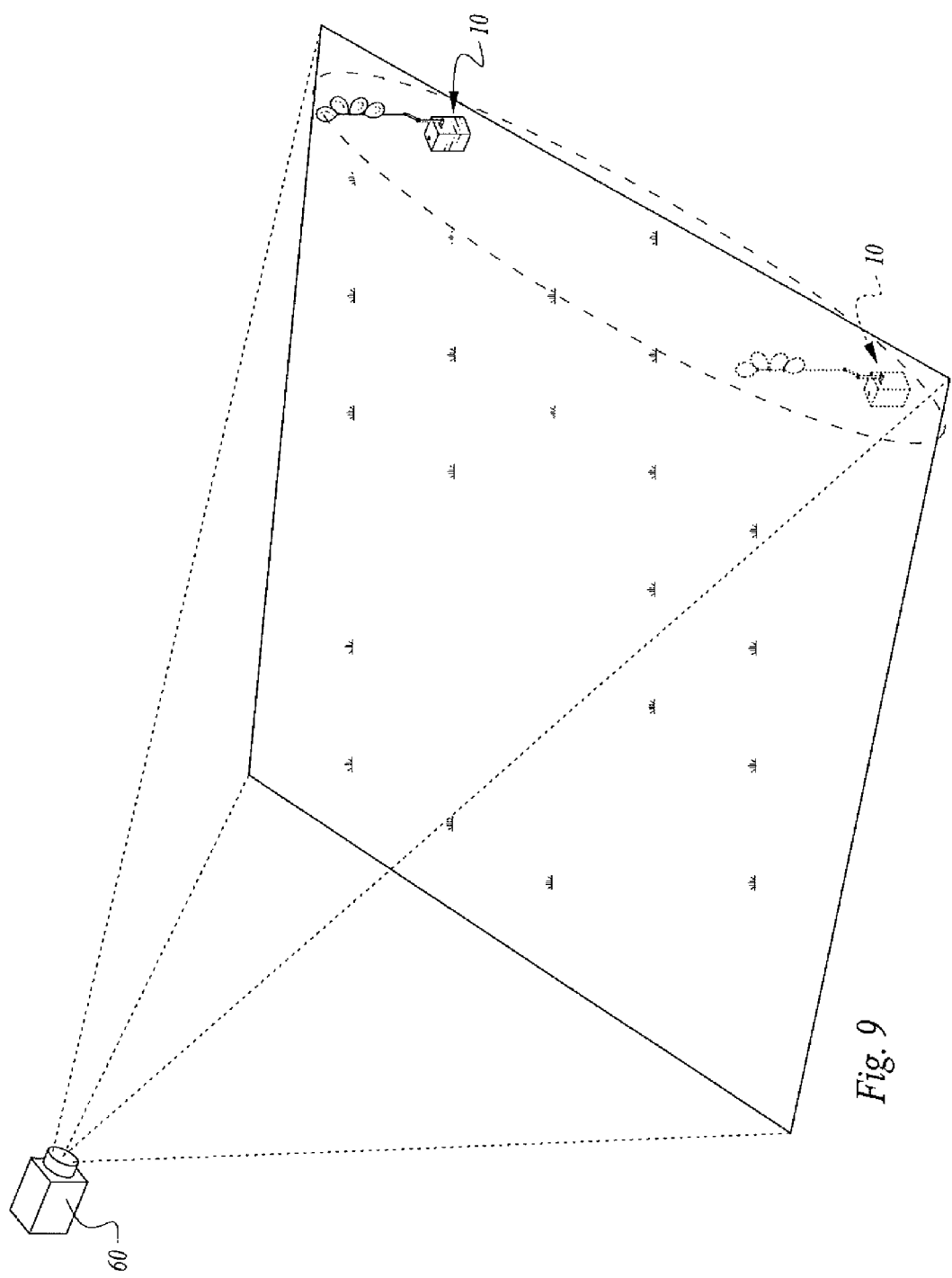
FIG. 9 is a diagrammatic view (not to scale) showing positioning of the apparatus at two alternative locations (one in solid line and one in dash line) relative to the camera and camera view.

Referring now to the drawings, apparatus 10 constructed in accordance with the teachings of the present invention is illustrated. The apparatus is for calibrating motion detection equipment including a video camera.

The apparatus 10 includes a lighter than air motion object structure including at least one balloon filled with helium or other lighter than air gas.

FIG. 2 illustrates an embodiment 12 of motion object structure having two helium filled balloons 14 and two air filled balloons 16, the helium filled balloons disposed above the air filled balloons. All of the balloons are strung together on a string or cord 18.

FIG. 3 discloses an alternative arrangement wherein one helium filled balloon 20 and one air filled balloon 22 are provided, the balloons 20, 22 being larger than balloons 14, 16. Different numbers of balloons may also be employed but in order for the motion object structure to be effective for calibration, the size must be comparable or approximate to the size of a human being. That is to say, the motion object structure when extending upwardly into the air has a maximum vertical dimension within the range of from about four feet to about seven feet and a maximum horizontal dimension within the range of from about one foot to about four feet.

If one were to use plastic sheet, even lightweight plastic sheet, to make the motion object structure without employment of helium or lighter than air gas within an interior thereof, a sizable motor would be needed to move it. Moreover, large wind force may jam the motor and/or topple the device unless heavy ballast or anchors with a strong framework are used, such as those adopted by the electrical equivalent of human moving signs. The weight and bulk of devices made with this approach would also make it difficult to transport.

The use of balloons as the motion object of the subject invention overcomes these problems. That is, the motion object structure preferably consists of one or more inflatable balloons, and at least one of them is filled with gas that is lighter than air, such as helium, to make it fly upwards. The total uplift force is dependent on the size and number of helium balloons and must be strong enough to keep the entire motion object structure flying upwards with tension on the tie string or cord 18. Instead of a string of balloons, a single large helium balloon similar to the size of a human may also work, but it will cost significantly more and will incur larger helium expenses.

The motion object in this invention has a number of important benefits:

1. It is extremely light, even a small motor that consumes very little power can generate predictable movements.

2. Under wind, the motion object and the tie string will fly at an angle, which drastically reduces the wind load on the tie string and the device structure, thus requiring much less anchor force or ballast weight.

3. Prior to inflating the balloons, the entire device is very compact, very easy to transport.

4. Regular helium balloons may last approximately 12 hours, a duration long enough to stay afloat for night calibration, but short enough to drop to the ground quickly, not drawing much attention. Therefore, even after being left in the field a long time, there is still a good chance of recovery even though they are disposable. It will reduce environmental pollution through recycling.

5. A string of balloons not only reduces the balloon cost, but also cuts the helium cost significantly as some of the balloons can be filled with just air. The droopy air balloons make the whole device assembly less attractive to steal or to vandalize.

Another component of the apparatus is movement generator structure 28.

The movement generator structure 28 moves the human sized motion object structure up and down and sideways. (See FIGS. 7 and 8). Moving the motion object structure up and down has the same effect as moving horizontally in the real life situation involving a human intruder. From the general camera motion detection standpoint, movements from up and down or sideways are detected the same way.

The movement generator structure includes a movable structural element to which the cord 18 is attached in the illustrated embodiment, the movable structure element includes a rotation arm 32 which is connected to and rotated by an electric motor 34. Electric motor 34 is powered by a battery 36 and in the arrangement illustrated the battery and electric motor are both positioned in an enclosure 38. The motor is preferably a geared motor secured to the wall of the enclosure 38 close to the top of the enclosure. Because battery is relatively heavy, it may also serve as a ballast to hold down the apparatus.

The geared motor is set to an appropriate rotation speed. The shaft of the motor protrudes outside of the enclosure and the rotation arm is attached to the shaft of the motor externally of the enclosure.

The enclosure should have a lid to keep its contents from exposure to the elements. At the bottom of the enclosure are anchoring holes at the corners to allow anchors such as tent stakes to secure the device to the ground if necessary. Under normal circumstances, the weight of the apparatus is sufficient to hold the motion object structure. If the apparatus is placed on a concrete surface and it is extremely windy, additional weight such as gravel or sand can be added inside the enclosure. The enclosure needs to be of sufficient size so that even when strong wind blows the balloons and string sideways, the top and side edges of the enclosure can prevent the tie string from wrapping itself around the rotation arm and motor shaft. The length and the amount of off-set on the anti-tangle tab is dependent on the size of the enclosure. The enclosure can be made of sheet metal, plastic or even paper. In the event a paper enclosure is used, water protection such as a plastic bag is needed for wet weather.

The movement generator structure additionally includes a double-ended anti-tangle tab 40 rotatably connected to the distal end of rotation arm 32. The tab end opposite the end of the anti-tangle tab connected to the rotation arm is connected to cord 18. The tab 40 has just two holes, one for securing to a short shaft at the distal end of the rotation arm for free spinning, the other hole of the tab being employed to attach the cord. Attachment of the cord to the tab suitably takes place after the balloons are inflated on site.

The ends of the anti-tangle tab are offset with respect to one another. This feature minimizes chances of the rotation arm entangling the cord. The anti-tangle tab is critical to avoid twisting of the cord or getting the cord wrapped up on the motor shaft. The rotation arm should be short enough so that the anti-tangle tab will not hit the ground.

The length of the rotation arm determines the motion magnitude. The motion object structure's vertical and horizontal movements in the arrangement illustrated may, for example, suitably be two times the length of the rotation arm. The rotation speed of the motor determines how fast the motion object structure moves up and down and sideways. The rotation arm and the anti-tangle tab can be made of light weight materials such as wood, plastic and sheet metal.

Another component of the apparatus of this invention is a controller 48 which is operatively associated with the movement generator structure for activating and deactivating the movement generator structure. FIG. 6 illustrates a controller 48 in the form of a photocell switch which can turn on the movement generator after dark. The photocell switch will switch off after sunrise, but the battery 36, which may be small, likely will be fully drained before then. The controller may also alternatively be a timer. A low cost electronic timer can schedule the on and off time of the movement generator structure at a specified time period after dark. A timer, however, is still more costly than a photocell switch. If on-site workers are available the following morning after a night calibration to collect the calibration devices, using a timer, rather than a photocell switch, makes sense.

Further, rechargeable batteries may be used. If the calibration devices are in disposable situations, using a photocell switch with small disposable batteries would be the preferred approach.

In the winter time when it gets dark very early, the calibration device can be used as a motion simulator while the installation worker is still on site to allow for efficient one person calibration. In such a situation, the controller is simply a manual on-off power switch.

Another approach is to simply utilize a controller having a wireless radio receiver to turn the power to the motion generator structure on or off. As the cost of radio receivers continue to drop, a wireless controller may be feasible in the future. FIGS. 6 and 7 illustrate the antenna 52 of a wireless receiver, a wireless transmitter 54 being shown in FIG. 7.

With reference to FIG. 9, the apparatus 10 is used as follows. Within a camera view, the objects located at the top edge are the furthest away from the camera 60 and will appear the smallest. The calibration apparatus should be placed along the top edge within the camera view, preferably at the top right or left corners where objects will appear the smallest in a camera view.

If there is a installer on site after dark, he can switch on the apparatus and do motion calibration by himself. The device can be moved from camera to camera until all of them are calibrated.

If camera installation is completed during daytime pending night calibration, one calibration device is needed for each camera, and they are placed along the top edge of each camera view. The worker may then leave the site. After dark, the calibration devices will all be turned on automatically by the controllers. The installer then controls the motion sensitivity adjustments to his equipment via remote access, a very common feature in today's surveillance equipment. With the calibration devices simulating human movements on site after dark, he can pin down the sensitivity settings accurately and remotely without being on site.

Prior to deploying the calibration aid for motion calibration, the device itself needs to be calibrated for properly simulating intrusion motion. The size of the string of balloons, the magnitude and speed of the movement all need to be adjusted accordingly as necessary.

The invention claimed is:

1. Apparatus for calibrating motion detection equipment including a video camera, said apparatus comprising, in combination:
   a lighter than air motion object structure wholly or partially comprising at least one balloon filled with helium or other lighter than air gas and at least one balloon not filled with a lighter than air gas connected to and disposed below said at least one balloon filled with helium or other lighter than air gas, the combined size of said balloons approximating the size of a human being;
   a movement generator structure for moving the lighter than air motion object structure within the view of the video camera;
   a controller operatively associated with said movement generator structure for activating and deactivating said movement generator structure;
   a power source for providing electrical power to said controller and said movement generator structure; and
   at least one cord or other elongated, flexible connector connecting said lighter than air motion object structure to said movement generator structure, and said movement generator structure including a movable structural element to which said cord or other elongated, flexible connector is attached and an electric motor powered by said power source for moving said lighter than air movable structural element to move said cord or other elongated, flexible connector and cause simultaneous movement of said lighter than air motion object structure both up and down and side to side.

2. The apparatus according to claim 1 wherein said lighter than air motion object structure when extending upwardly in the air has a maximum vertical dimension within the range of from about four feet to about seven feet and a maximum horizontal dimension within the range of from about one feet to about four feet.

3. The apparatus according to claim 1 wherein said power source is a battery.

4. The apparatus according to claim 1 wherein said movement generator structure includes a rotation arm connected to said at least one cord or other elongated, flexible connector and to and rotated by said electric motor.

5. The apparatus according to claim 1 wherein said motion object structure is positioned relative to said video camera with the motion object structure placed along or closely adjacent to the top edge within the camera view.

6. A method for calibrating motion detection equipment including a video camera, said method including the following steps:
   providing a lighter than air motion object structure wholly or partially comprising at least one balloon filled with helium or other lighter than air gas and at least one balloon not filled with a lighter than air gas connected to and disposed below said at least one balloon filled with helium or other lighter than air gas, the combined size of said balloon approximating the size of a human being and positioning the lighter than air motion object structure within the view of the video camera;
   employing a movement generator structure to move the lighter than air motion object structure within the view of the video camera;
   utilizing a controller operatively associated with said movement generator structure for activating and deactivating said movement generator structure;
   employing a power source to provide electrical power to said controller and said movement generator structure;
   calibrating the video camera based on the movement of the motion object structure; and
   providing at least one cord or other elongated, flexible connector connecting said lighter than air Motion object structure to said movement generator structure, said movement generator structure including a movable structural element to which said cord or other elongated, flexible connector is attached and an electric motor powered by said power source for moving said movable structural element to move said cord or other elongated, flexible connector and cause simultaneous movement of said lighter than air motion object structure both up and down and side to side.

7. The method according to claim 6 wherein said motion object structure when extending upwardly in the air has a maximum vertical dimension within the range of from about four feet to about seven feet and a maximum horizontal dimension within the range of from about one foot to about four feet.

8. The method according to claim 6 wherein said power source is a battery.

9. The method according to claim 6 wherein said movement generator structure includes a rotation arm connected to said at least one cord or other elongated, flexible connector and to and rotated by said electric motor.

10. The method according to claim 6 wherein said motion object structure is positioned relative to said video camera with the motion object structure placed along or closely adjacent to the top edge within the camera view.

11. Apparatus for calibrating motion detection equipment including a video camera, said apparatus comprising, in combination:
   a lighter than air motion object structure wholly or partially comprising at least one balloon filled with helium or other lighter than air gas;
   a movement generator structure for moving the motion object structure within the view of the video camera;
   a controller operatively associated with said movement generator structure for activating and deactivating said movement generator structure;
   a power source for providing electrical power to said controller and said movement generator structure; and
   at least one cord or other elongated connector connecting said motion object structure to said movement generator structure, said movement generator structure including a movable structural element to which said cord or other elongated connector is attached and an electric motor powered by said power source for moving said movable structural element to move said cord or other elongated connector, said movable structural element including a rotation arm connected to and rotated by said electric motor, and said movement generator structure additionally including a double-ended anti-tangle tab rotatably connected to said rotation arm at one end of the anti-tangle tab, the other end of said anti-tangle tab connected to said elongated connector, and the ends of said anti-tangle tab being off-set with respect to one another.

12. A method for calibrating motion detection equipment including a video camera, said method including the following steps:
   providing a lighter than air motion object structure wholly or partially comprising at least one balloon filled with helium or other lighter than air gas and positioning the lighter than air motion object structure within the view of the video camera;
   employing a movement generator structure to move the motion object structure within the view of the video camera;
   utilizing a controller operatively associated with said movement generator structure for activating and deactivating said movement generator structure;
   employing a power source to provide electrical power to said controller and said movement generator structure;
   calibrating the video camera based on the movement of the motion object structure; and
   providing at least one cord or other elongated connector and employing said cord or other elongated connector to connect said motion object structure to said movement generator structure, said movement generator structure including a movable structural element to which said cord or other elongated connector is attached and an electric motor powered by said power source for moving said movable structural element to move said cord or other elongated connector, said movable structural element including a rotation arm connected to and rotated by said electric motor, and movement generator structure additionally including a double-ended anti-tangle tab rotatably connected to said rotation arm at one end of the anti-tangle tab, the other end of said anti-tangle tab connected to said elongated connector, and the ends of said anti-tangle tab being off-set with respect to one another.

\* \* \* \* \*